(12) United States Patent
Aguirre et al.

(10) Patent No.: US 8,913,554 B2
(45) Date of Patent: Dec. 16, 2014

(54) FLEXIBLE PROVISIONING OF WIRELESS RESOURCES BASED ON MORPHOLOGY TO SUPPORT BROADCASTING/MULTICASTING

(75) Inventors: Sergio Aguirre, Southlake, TX (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 345 days.

(21) Appl. No.: 13/468,264

(22) Filed: May 10, 2012

(65) Prior Publication Data

US 2013/0301539 A1    Nov. 14, 2013

(51) Int. Cl.
*H04W 4/00*    (2009.01)

(52) U.S. Cl.
USPC ............................ 370/328; 370/230; 370/235

(58) Field of Classification Search
USPC .............. 370/229, 230, 235, 236, 254, 310.2, 370/328
See application file for complete search history.

(56) References Cited

U.S. PATENT DOCUMENTS

| | | | |
|---|---|---|---|
| 7,142,868 B1 * | 11/2006 | Broyles et al. | 455/453 |
| 8,073,455 B1 * | 12/2011 | Xie et al. | 455/452.1 |
| 2004/0214583 A1 * | 10/2004 | Graham et al. | 455/453 |
| 2007/0049295 A1 * | 3/2007 | Soliman et al. | 455/456.3 |
| 2007/0099561 A1 * | 5/2007 | Voss | 455/12.1 |
| 2008/0102803 A1 * | 5/2008 | Chow et al. | 455/414.2 |
| 2009/0225722 A1 * | 9/2009 | Cudak et al. | 370/330 |
| 2010/0178925 A1 * | 7/2010 | Bernini et al. | 455/446 |
| 2011/0038325 A1 * | 2/2011 | Varma | 370/329 |
| 2011/0136478 A1 * | 6/2011 | Trigui | 455/418 |

* cited by examiner

*Primary Examiner* — Kwang B Yao
*Assistant Examiner* — Nguyen Ngo

(57) ABSTRACT

A system may receive base station configuration data associated with base stations, classify the base stations into morphologies based on the base station configuration data, identify resource utilization data associated with the base stations, generate resource allocation recommendations for the base stations based on the resource utilization data and the morphologies, and transmit the resource allocation recommendations for the base stations to permit the stations to allocate resources based on the resource allocation recommendations.

20 Claims, 12 Drawing Sheets

| Base Station ID 705 | Morphology 710 | Sampling Interval 715 | Resource Utilization at Time T = 1 720-1 | ... | Resource Utilization at Time T = X 720-X | Average Resource Utilization 725 |
|---|---|---|---|---|---|---|
| BS-1 | Urban | 5 minutes | 40% GBR 55% non-GBR 5% eMBMS | ... | 40% GBR 45% non-GBR 15% eMBMS | 40% GBR 50% non-GBR 10% eMBMS |
| BS-2 | Suburban | 30 minutes | 40% GBR 50% non-GBR 10% eMBMS | ... | 40% GBR 40% non-GBR 20% eMBMS | 40% GBR 45% non-GBR 15% eMBMS |
| BS-3 | Rural | 2 hours | 35% GBR 50% non-GBR 15% eMBMS | ... | 45% GBR 30% non-GBR 25% eMBMS | 40% GBR 40% non-GBR 20% eMBMS |
| BS-4 | Picocell | 1 hour | 35% GBR 20% non-GBR 45% eMBMS | ... | 45% GBR 30% non-GBR 25% eMBMS | 40% GBR 25% non-GBR 35% eMBMS |
| BS Cluster-1 | Suburban | 45 minutes | 40% GBR 40% non-GBR 20% eMBMS | ... | 40% GBR 30% non-GBR 30% eMBMS | 40% GBR 35% non-GBR 25% eMBMS |

FIG. 7

FLEXIBLE PROVISIONING OF WIRELESS RESOURCES BASED ON MORPHOLOGY TO SUPPORT BROADCASTING/MULTICASTING

BACKGROUND

Wireless networks allocate base station resources for different services, such as voice services, unicast services, broadcast services, and multicast services. Evolved multimedia broadcast multicast service ("eMBMS") allows multimedia content to be sent once and received by many end users. Unicast services transmit content multiple times, once to each unique destination address. Base stations do not always allocate resources efficiently between different transmission services, such as unicast services and eMBMS. The allocation of wireless network resources between different transmission services is often static and inflexible, resulting in the inefficient use of resources.

BRIEF DESCRIPTION OF THE DRAWINGS

FIG. 7 is a diagram of an example data structure that stores information associated with base station resource utilization;

DETAILED DESCRIPTION OF PREFERRED EMBODIMENTS

The following detailed description of example embodiments refers to the accompanying drawings. The same reference numbers in different drawings may identify the same or similar elements.

Wireless networks are often configured in a way that treats every base station in the network identically or similarly. Additionally, wireless networks often operate under the assumption that all base stations are distributed uniformly. The assumption of uniform base station distribution and the identical or similar treatment of every base station may result in an inefficient allocation of wireless network resources (e.g., Long Term Evolution ("LTE") resources, bandwidth, capacity, coverage, data rates, number of radio frames/subframes, transmit power, channel allocation, handover criteria, modulation scheme, error coding scheme, etc.).

Implementations described herein are able to more efficiently allocate wireless network resources, radio access network ("RAN") resources, and/or LTE resources. This may be achieved by creating different resource allocation recommendations for different base station configurations and/or morphologies.

Figure 1:
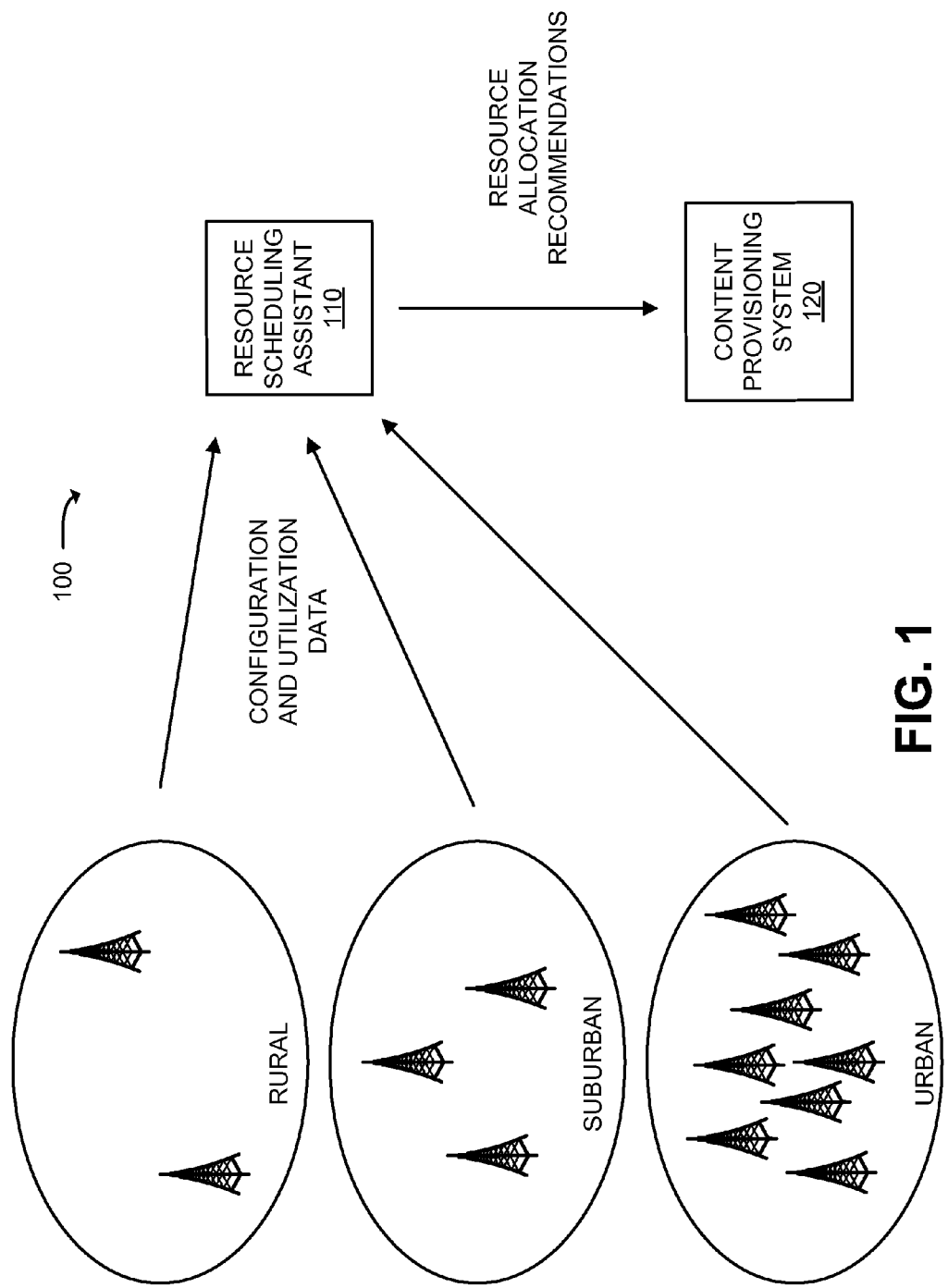
FIG. 1 is a diagram that illustrates an overview of an implementation described herein.

FIG. 1 is a diagram that illustrates an overview 100 of an implementation described herein. As illustrated in FIG. 1, base stations may be classified into different morphologies, such as rural, suburban, and/or urban. A morphology is a classification for a set of one or more base stations. Resource scheduling assistant 110 may receive configuration data associated with base stations and use the configuration data to classify the base stations into morphologies. This classification may be based on factors, such as a geographic location of a base station, a distance between base stations, a quantity of base stations located within a particular boundary, and/or a base station height.

Resource scheduling assistant 110 may also receive utilization data associated with base stations. Utilization data may include an amount, a portion and/or a fraction of base station resources being utilized by a base station for different services, such as guaranteed bit rate services, non-guaranteed bit rate services, unicast services, broadcast services, multicast services, and/or evolved multimedia broadcast multicast services ("eMBMS").

Resource scheduling assistant 110 may use the utilization data to create resource allocation recommendations for different base station morphologies. Resource scheduling assistant 110 may communicate the resource allocation recommendations to content provisioning system 120. Content provisioning system 120 may direct one or more base stations, classified into a particular morphology, to allocate base station resources according to the resource allocation recommendations associated with the morphology. As a result, base station resources may be allocated more efficiently.

Figure 2:
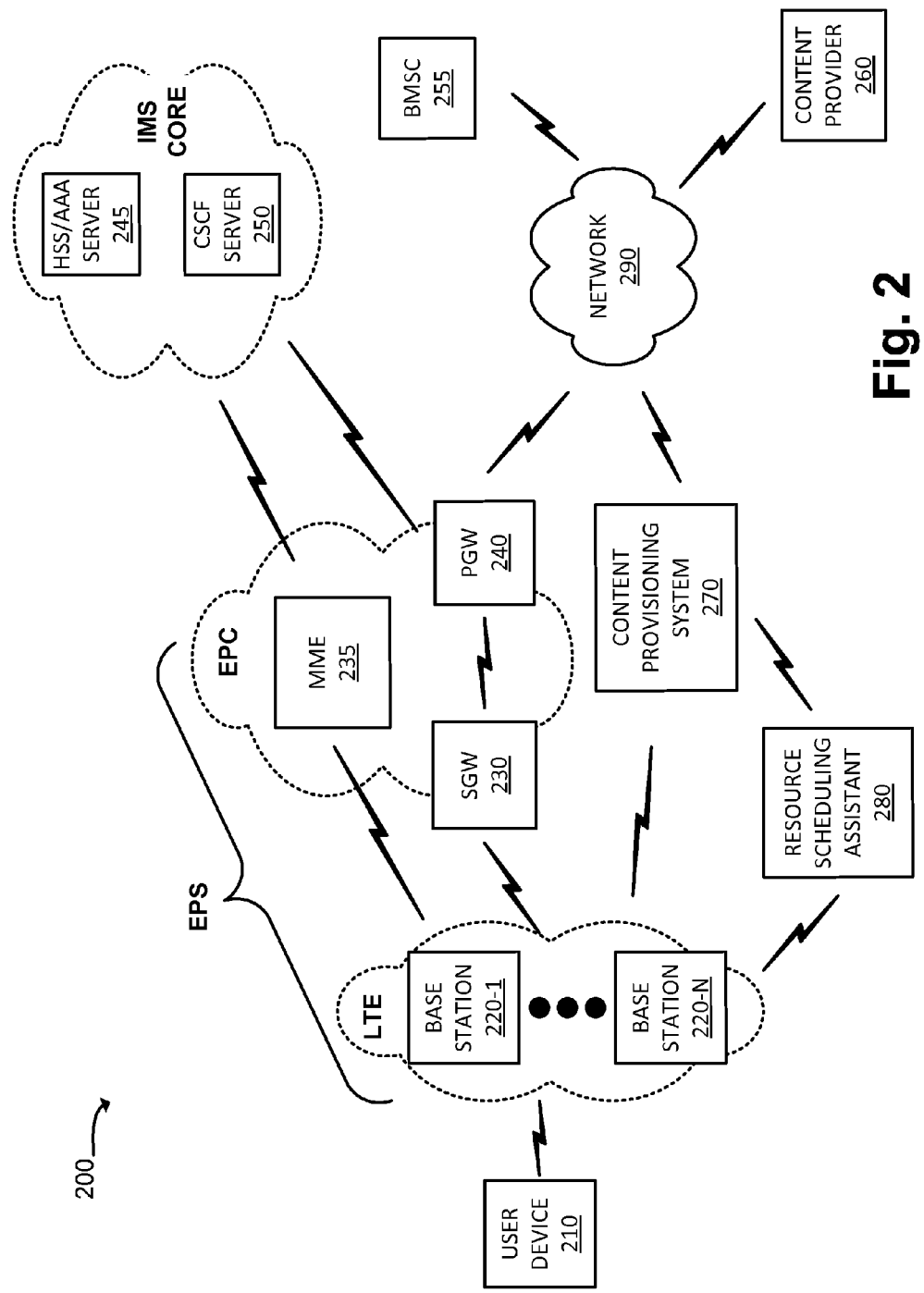
FIG. 2 is a diagram of an example environment in which systems and/or methods described herein may be implemented.

FIG. 2 is a diagram of an example environment 200 in which systems and/or methods described herein may be implemented. Environment 200 may include a user device 210, a set of base stations 220-1 through 220-N (where N≥1) (hereinafter referred to collectively as "base stations 220" and individually as "base station 220"), a serving gateway 230 (hereinafter referred to as "SGW 230"), a mobility management entity device 235 (hereinafter referred to as "MME 235"), a packet data network ("PDN") gateway 240 (hereinafter referred to as "PGW 240"), a home subscriber server ("HSS")/authentication, authorization, accounting ("AAA") server 245 (hereinafter referred to as "HSS/AAA server 245"), a call session control function ("CSCF") server 250 (hereinafter referred to as "CSCF server 250"), a broadcast multicast service center 255 (hereinafter referred to as "BMSC 255"), a content provider 260, a content provisioning system 270, a resource scheduling assistant 280, and a network 290.

The number of devices and/or networks illustrated in FIG. 2 is provided for explanatory purposes. In practice, there may be additional devices and/or networks, fewer devices and/or networks, different devices and/or networks, or differently arranged devices and/or networks than are shown in FIG. 2. Furthermore, two or more of the devices illustrated in FIG. 2 may be implemented within a single device, or a single device may be implemented as multiple, distributed devices. Additionally, one or more of the devices of environment 200 may perform one or more functions described as being performed by another one or more of the devices of environment 200.

Devices of environment 200 may interconnect via wired connections, wireless connections, or a combination of wired and wireless connections.

An implementation is described as being performed within a long term evolution ("LTE") network for explanatory purposes. In other implementations, the implementations may be performed within a network that is not an LTE network.

Environment 200 may include an evolved packet system ("EPS") that includes an LTE network and/or an evolved packet core ("EPC") that operate based on a third generation partnership project ("3GPP") wireless communication standard. The LTE network may be a radio access network ("RAN") that includes one or more base stations 220 that take the form of evolved Node Bs ("eNBs") via which user device 210 communicates with the EPC. The EPC may include SGW 230, MME 235, and/or PGW 240 that enable user device 210 to communicate with network 290 and/or an Internet protocol ("IP") multimedia subsystem ("IMS") core. The IMS core may include HSS/AAA server 245 and/or CSCF server 250 and may manage authentication, session initiation, account information, profile information, etc., associated with user device 210.

User device 210 may include any computation or communication device, such as a wireless mobile communication device, that is capable of communicating with base station 220 and/or a network (e.g., network 290). For example, user device 210 may include a radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, a laptop computer, a tablet computer, a camera, a personal gaming system, mobile code readers, parking meters, energy use monitors, vending machines, and/or another type of mobile computation or communication device. User device 210 may send traffic to and/or receive traffic from network 290.

Base station 220 may include one or more devices that receive, process, and/or transmit traffic, such as audio, video, text, and/or other data, destined for and/or received from user device 210. In an example implementation, base station 220 may be an eNB associated with the LTE network that receives traffic from and/or sends traffic to network 290 via SGW 230 and/or PGW 240. Base station 220 may send traffic to and/or receive traffic from user device 210 via an air interface. In another example, one or more other base stations 220 may be associated with a RAN that is not associated with the LTE network. In some implementations, base station 220 may be a small cell, such as a microcell, a picocell and/or a femtocell. Additionally, or alternatively, multiple spatially separated radiating elements may be connected to a common base station, for example using a distributed antenna system (DAS).

SGW 230 may include one or more computation or communication devices that gather, process, search, store, and/or provide information in a manner described herein. SGW 230 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. In one example implementation, SGW 230 may aggregate traffic received from one or more base stations 220 associated with the LTE network, and may send the aggregated traffic to network 290 (e.g., via PGW 240) and/or other network devices associated with the IMS core and/or the EPC. SGW 230 may also receive traffic from other network devices and/or may send received traffic to user device 210 via base station 220. SGW 230 may perform operations associated with handing off user device 210 from and/or to the LTE network. In some implementations, SGW 230 may be a multimedia broadcast multicast services gateway (MBMS GW) that may transmit broadcast and/or multicast packets to base stations 220 and/or manage eMBMS sessions (e.g., session start/stop).

MME 235 may include one or more computation or communication devices that gather, process, search, store, and/or provide information in a manner described herein. For example, MME 235 may perform operations relating to authentication of user device 210. In some implementations, MME 235 may facilitate the selection of a SGW 230 and/or PGW 240 to serve traffic to/from user device 210. MME 235 may perform operations associated with handing off user device 210 from a first base station 220 to a second base station 220 when user device 210 is exiting a cell associated with the first base station 220. MME 235 may also perform an operation to hand off user device 210 from a second base station 220 to a first base station 220 when user device 210 is entering the cell associated with first base station 220. Additionally, or alternatively, MME 235 may select another MME (not pictured), to which user device 210 should be handed off (e.g., when user device 210 moves out of range of MME 235).

PGW 240 may include one or more computation or communication devices that gather, process, search, store, and/or provide information in a manner described herein. PGW 240 may include one or more data processing and/or traffic transfer devices, such as a gateway, a router, a modem, a switch, a firewall, a NIC, a hub, a bridge, a proxy server, an OADM, or some other type of device that processes and/or transfers traffic. In one example implementation, PGW 240 may include a device that aggregates traffic received from one or more SGWs 230, and may send the aggregated traffic to network 290. In another example implementation, PGW 240 may receive traffic from network 290 and may send the traffic to user device 210 via SGW 230.

HSS/AAA server 245 may include one or more server devices, or other types of computation or communication devices, that gather, process, search, store, and/or provide information in a manner described herein. For example, HSS/AAA server 245 may manage, update, and/or store, in a memory associated with HSS/AAA server 245, profile information associated with user device 210 that identifies applications and/or services that are permitted for and/or accessible by user device 210, information associated with a user of user device 210 (e.g., a username, a password, a personal identification number ("PIN"), etc.), rate information, minutes allowed, and/or other information. Additionally, or alternatively, HSS/AAA server 245 may include a device that performs authentication, authorization, and/or accounting operations associated with a communication session with user device 210.

CSCF server 250 may include one or more server devices, or other types of computation or communication devices, that gather, process, search, store, and/or provide information in a manner described herein. CSCF server 250 may process and/or route calls to and from user device 210 via the EPC. For example, CSCF server 250 may process calls received from network 290 that are destined for user device 210. In another example, CSCF server 250 may process calls received from user device 210 that are destined for network 290.

BMSC 255 may include one or more computation or communication devices that gather, process, search, store, and/or provide information in a manner described herein. BMSC 255 may provide scheduling information to control the distribution of content or media. For example, BMSC 255 may be used to assign a particular number of data channels per content according to a schedule. In an example implementation, BMSC 255 may reserve bandwidth before an event begins, and may transmit data (e.g., multimedia data) from content provider 260 when the event begins.

BMSC 255 may provide a mechanism for communicating broadcast and/or multicast attributes to content provisioning system 270, including a notification of an upcoming event, so that content provisioning system 270 may adjust the bandwidth on a data channel to accommodate the upcoming event. For example, BMSC 255 may send signals, messages, or alerts concerning an upcoming event to content provisioning system 270, and content provisioning system 270 may adjust the bandwidth for one or more channels to maximize network throughput without inducing congestion, jitter, and/or other conditions. Content provisioning system 270 may communicate these adjustments to base stations 220.

Additionally, or alternatively, BMSC 255 may retrieve particular content from the memory of BMSC 255. For example, BMSC 255 may receive content from content provider 260, may store the content until a scheduled time or other condition is met, and may provide the content to content provisioning system 270 for distribution to user device 210.

Content provider 260 may include any type or form of content provider. For example, content provider 260 may include a website host (e.g., a provider of one or more websites, such as websites located at www.verizon.com, www.yahoo.com, www.nbc.com, etc.). Additionally, or alternatively, content provider 260 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., YouTube, Vimeo, Netflix, Hulu, Veoh, etc.) that stream content from web sites and/or permit content to be downloaded (e.g., via progressive download, etc.). Content provider 260 may include on-demand content providers (e.g., video on demand providers, pay per view providers, etc.).

Content provisioning system 270 may include one or more gateway devices, or other types of computation or communication devices, that gather, process, search, store, and/or provide information in a manner described herein. For example, content provisioning system 270 may be a broadcast video provisioning system (BVPS). In an example implementation, content provisioning system 270 may process guaranteed bit rate traffic, non-guaranteed bit rate traffic, unicast traffic, broadcast traffic, multicast traffic, and/or eMBMS traffic to be distributed to one or more user devices 210. For example, content provisioning system 270 may receive traffic (e.g., streaming video and/or audio, progressive video and/or audio, etc.) from content provider 260 and/or BMSC 255. Content provisioning system 270 may transmit the traffic to user device 210 via network 290, the EPC, and/or the LTE. Content provisioning system 270 may buffer the traffic to ensure that the traffic is transmitted at a bandwidth and/or data rate that conforms to a policy associated with network 290, that abides by a service level agreement (SLA) with user device 210, and/or that can be processed by user device 210.

Content provisioning system 270 may transmit traffic as unicast traffic, multicast traffic, broadcast traffic, and/or eMBMS traffic. For example, content provisioning system 270 may transmit unicast traffic that is destined for user device 210. In another example, content provisioning system 270 may transmit traffic as multicast traffic that is destined for a group of user devices 210 (e.g., associated with a multicast group membership). Additionally, or alternatively, content provisioning system 270 may transmit traffic as broadcast traffic destined for a group of user devices 210 within a service area. When transmitting multicast and/or broadcast traffic, content provisioning system 270 may transmit a multicast and/or broadcast stream to base station 220 for distribution to one or more user devices 210 identified by the multicast and/or broadcast stream. In another example, content provisioning system 270 may transmit a copy of a multicast and/or broadcast stream to another base station 220 for distribution to another one or more user devices 210 identified by the copy of the multicast and/or broadcast stream.

Content provisioning system 270 may communicate with base stations 220 and/or resource scheduling assistant 280 to obtain traffic load information, resource utilization information, and/or resource allocation recommendations associated with base stations 220. Content provisioning system 270 may use the traffic load information, resource utilization information, and/or resource allocation recommendations to allocate RAN resources among each of base stations 220 and/or among frequency bands that are supported by third generation (3G) and/or fourth generation (4G) technologies that are based on the 3GPP standard. The frequency bands may include, for example, a PCS band, an advanced wireless services ("AWS") band, a lower 700 megahertz ("MHz") band, an upper 700 MHz band, a cellular band, and/or some other band (e.g., as specified by a 3GPP standard, etc.). For example, content provisioning system 270 may allocate a first frequency band and/or channel to an application and/or service (e.g., guaranteed bit rate services, such as voice-over-IP ("VoIP") traffic, voice traffic, etc.). In another example, content provisioning system 270 may allocate a second frequency band and/or channel to another application and/or service (e.g., unicast services, such as Internet traffic, email traffic, etc.). In yet another example, content provisioning system 270 may allocate a third frequency band and/or channel to a further application and/or service to be transmitted as multicast and/or broadcast traffic (e.g., using eMBMS protocol that can be implemented by the LTE network based on 4G technologies).

Content provisioning system 270 may direct base stations 220 to reserve resources for a particular time period and/or for particular services, such as eMBMS services, in accordance with resource allocation recommendations received from resource scheduling assistant 280. Once the particular time period has elapsed, base stations 220 may release the reserved resources to the pool of resources available to one or more other services.

While shown as being located external to the EPC, content provisioning system 270 may be implemented within the EPC. Additionally, or alternatively, while shown as separate from SGW 230 and PGW 240, content provisioning system 270 may be integrated into (and a part of) SGW 230 and/or PGW 240.

Resource scheduling assistant 280 may include one or more server devices, or other types of computation or communication devices, that gather, process, search, store, and/or provide information in a manner described herein. Resource scheduling assistant 280 may communicate with base stations 220 to receive information associated with base station configuration, base station resource utilization, and/or other base station data. Resource scheduling assistant 280 may use the information received from base stations 220 to classify base stations 220 into morphologies and generate resource allocation recommendations for base station morphologies. Resource scheduling assistant 280 may communicate with content provisioning system 270 to receive information associated with content transmissions and to transmit base station resource allocation recommendations.

While shown as being located external to the EPC, resource scheduling assistant 280 may be implemented within the EPC. Additionally, or alternatively, while shown as separate from SGW 230 and PGW 240, resource scheduling assistant 280 may be integrated into (and a part of) SGW 230 and/or PGW 240.

Network 290 may include one or more wired and/or wireless networks. For example, network 290 may include a cellular network, a public land mobile network ("PLMN"), a second generation (2G) network, a 3G network, a 4G network, a fifth generation ("5G") network, and/or another network. Additionally, or alternatively, network 290 may include a wide area network ("WAN"), a metropolitan area network ("MAN"), a telephone network (e.g., the Public Switched Telephone Network ("PSTN")), an ad hoc network, an intranet, a fiber optic-based network (e.g., "FiOS"), and/or a combination of these or other types of networks.

Figure 3:
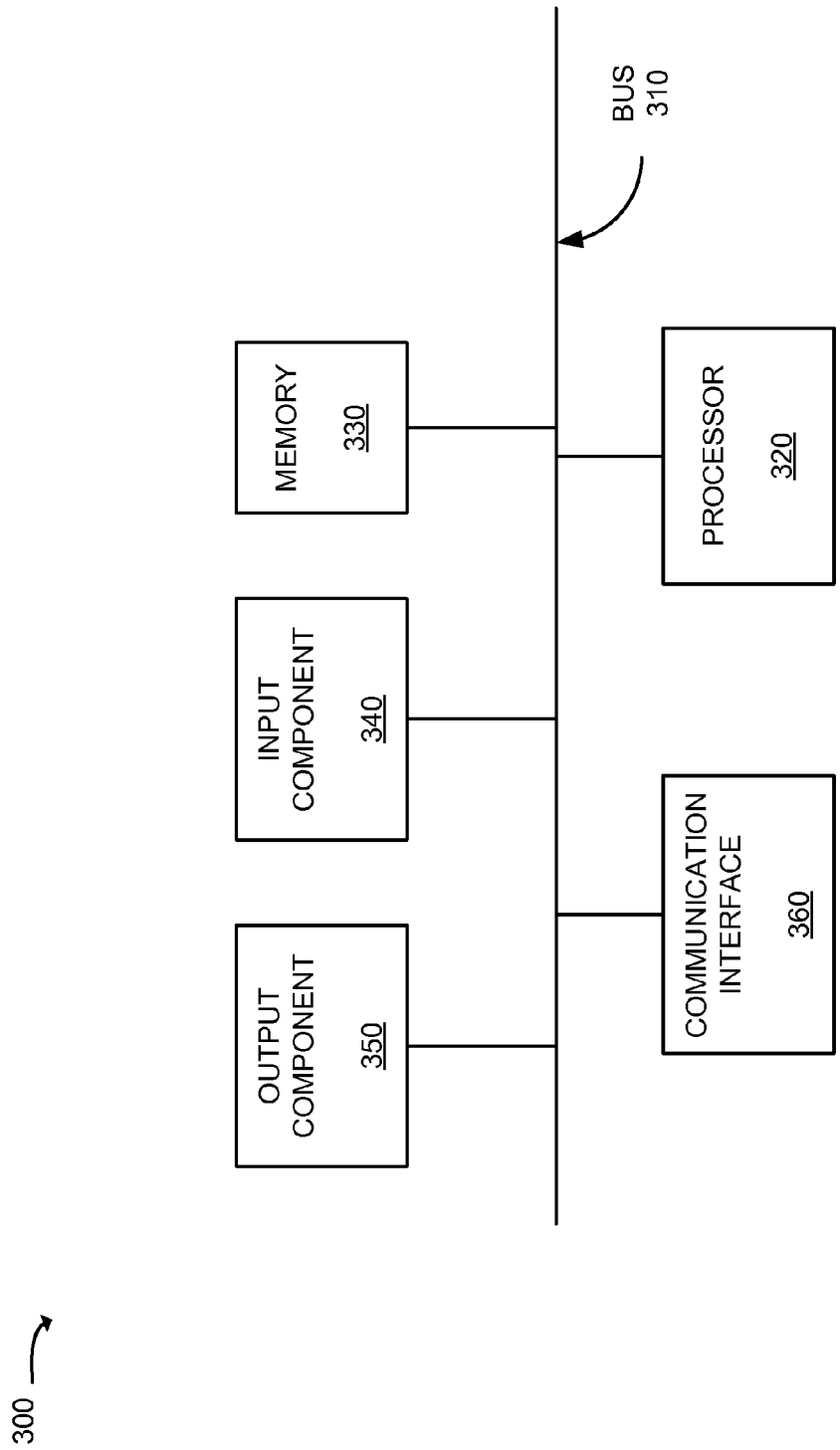
FIG. 3 is a diagram of example structural components of one or more devices of FIG. 2.

FIG. 3 is a diagram of example structural components of a device 300. Device 300 may correspond to user device 210, base station 220, SGW 230, MME 235, PGW 240, HSS/AAA server 245, CSCF server 250, content provider 260, content provisioning system 270, and/or resource scheduling assistant 280. Additionally, or alternatively, each of user device 210, base station 220, SGW 230, MME 235, PGW 240, HSS/AAA server 245, CSCF server 250, content provider 260, content provisioning system 270, and/or resource scheduling assistant 280 may include one or more devices 300 and/or one or more components of device 300.

Device 300 may include a bus 310, a processor 320, a memory 330, an input component 340, an output component 350, and a communication interface 360. In some implementations, device 300 may include additional components, fewer components, different components, or differently arranged components than illustrated in FIG. 3.

Bus 310 may include a path that permits communication among the components of device 300. Processor 320 may include a processor, a microprocessor, and/or any processing logic (e.g., a field-programmable gate array (FPGA), an application-specific integrated circuit (ASIC), etc.) that may interpret and execute instructions. Memory 330 may include a random access memory (RAM), a read only memory (ROM), or any type of dynamic or static storage device (e.g., a flash, magnetic, or optical memory) that may store information and/or instructions for use by processor 320.

Input component 340 may include any mechanism that permits a user to input information to device 300 (e.g., a keyboard, a keypad, a mouse, a button, a switch, etc.). Output component 350 may include any mechanism that outputs information (e.g., a display, a speaker, one or more light-emitting diodes (LEDs), etc.). Communication interface 360 may include any transceiver-like mechanism, such as a transceiver and/or a separate receiver and transmitter, that enables device 300 to communicate with other devices and/or systems, such as via a wired connection, a wireless connection, or a combination of wired and wireless connections. For example, communication interface 360 may include a mechanism for communicating with another device and/or system via a network, such as network 290. Additionally, or alternatively, communication interface 360 may be a logical component that includes input and output ports, input and output systems, and/or other input and output components that facilitate the communication of data to and/or from other devices, such as an Ethernet interface, an optical interface, a coaxial interface, an infrared interface, a radio frequency (RF) interface, a USB interface, or the like.

As described herein, device 300 may perform certain operations relating to wireless network resource management. Device 300 may perform these operations in response to processor 320 executing software instructions contained in a computer-readable medium, such as memory 330. A computer-readable medium may be defined as a non-transitory memory device. A memory device may include space within a single storage device or space spread across multiple storage devices.

Software instructions may be read into memory 330 from another computer-readable medium or from another device via communication interface 360. Software instructions stored in memory 330 may cause processor 320 to perform processes that are described herein. Additionally, or alternatively, hardwired circuitry may be used in place of or in combination with software instructions to implement processed described herein. Thus, implementations described herein are not limited to any specific combination of hardware circuitry and software.

Figure 4:
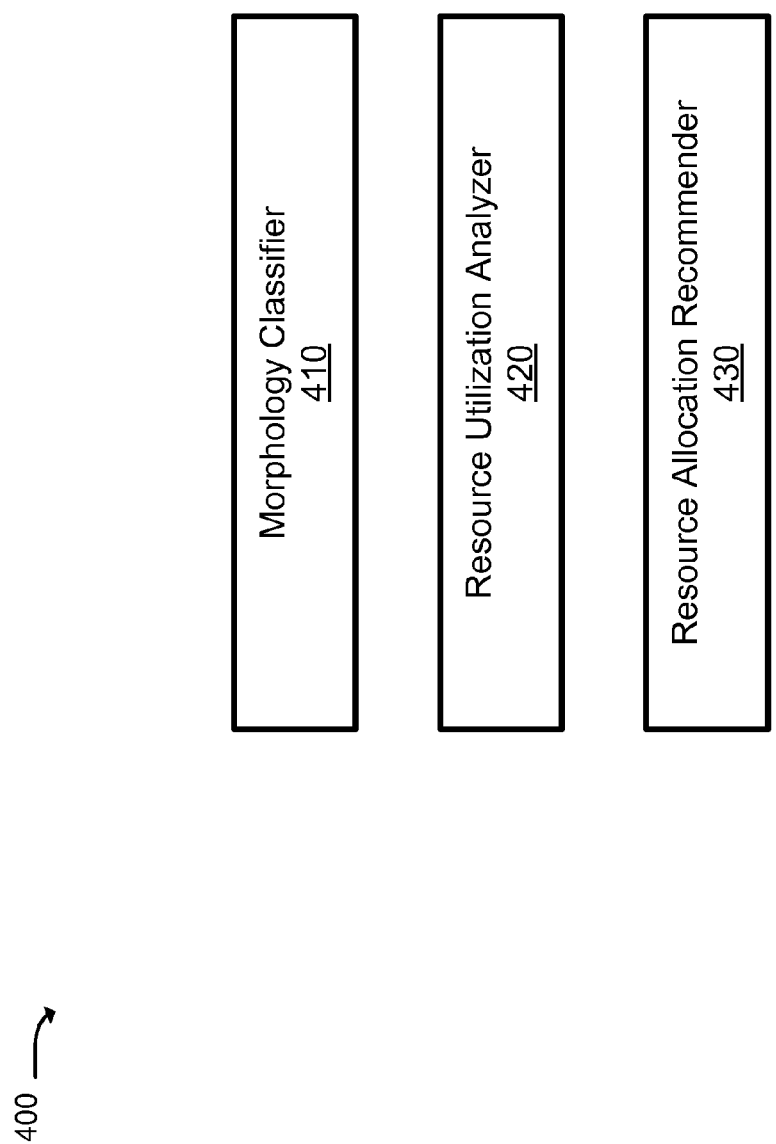
FIG. 4 is a diagram of example functional components of one or more devices of FIG. 2.

FIG. 4 is a diagram of example functional components of a device 400. In some implementations, device 400 may correspond to resource scheduling assistant 280. As illustrated, device 400 may include a morphology classifier 410, a resource utilization analyzer 420, and a resource allocation recommender 430. Each of functional components 410-430 may be implemented using one or more components shown in FIG. 3. Resource scheduling assistant 280 may individually include all of the components depicted in FIG. 4, or the components depicted in FIG. 4 may be distributed singularly or duplicatively in any manner between the devices illustrated in FIG. 2. In some implementations, resource scheduling assistant 280 may include other functional components (not shown) that aid in wireless network resource management.

Morphology classifier 410 may receive data that aids in classifying base stations 220 into morphologies. The data received by morphology classifier 410 may include base station configuration data, which may be received from base stations 220. Base station configuration data may identify a geographic location of a base station 220 (e.g., a latitude and/or a longitude, geo-coordinates, street address, etc.), a distance between two or more base stations 220, an average distance between three or more base stations 220, a quantity of base stations 220 located within a particular area (e.g., one or more cells and/or sectors, a geographic area, etc.), an average quantity of base stations 220 located within two or more areas, a height of a base station 220, an antenna height of a base station 220, and/or a resource utilization of a base station 220 (as described elsewhere herein).

In some implementations, base station configuration data may identify an inter-site distance and/or an average inter-site distance between base stations 220. An inter-site distance may refer to the distance between two neighboring base stations 220 (e.g., two base stations 220 that are closer to one another than the two base stations 220 are to any other base station 220, or two base stations 220 having a distance between them that is less than or equal to the distance between each of the two base stations 220 and any other base station 220). An average inter-site distance may refer to the average inter-site distances for a group of base stations 220 located within a particular area. Additionally, or alternatively, morphology classifier 410 may calculate base station configuration data from received base station configuration data. For example, morphology classifier 410 may use information identifying the geographic locations of multiple base stations 220 to calculate an average distance between base stations 220.

Morphology classifier 410 may use any type or combination of base station configuration data to classify base stations 220 into morphologies. In one example implementation, morphology classifier 410 may classify base stations 220 into morphologies based on a geographic location of base station 220. For example, base stations 220 located in major cities may be classified into an urban morphology.

In another example implementation, morphology classifier 410 may classify base stations 220 into morphologies based on a distance between two or more base stations 220. For example, base stations 220 having an inter-site distance of less than 1 kilometer may be classified into an urban morphology, base stations 220 having an inter-site distance between 1 and 3 kilometers may be classified into a suburban morphology, and base stations 220 having an inter-site distance greater than 3 kilometers may be classified into a rural morphology.

Morphology classifier 410 may use any inter-site distance as a threshold for separating base stations 220 into different morphologies. For example, base stations 220 having an inter-site distance less than 100 meters may be classified into a femtocell morphology, base stations 220 having an inter-site distance between 100 meters and 500 meters may be classified into a picocell morphology, and base stations 220 having an inter-site distance greater than 500 meters may be classified into a large cell morphology.

In another example implementation, morphology classifier 410 may classify base stations 220 into morphologies based on an average distance between three or more base stations 220. For example, three base stations 220 with an average distance between each pair of base stations 220 of less than 1 kilometer may be classified into an urban morphology.

In another example implementation, morphology classifier 410 may classify base stations 220 into morphologies based on a quantity of base stations 220 located within a particular area. For example, if there are fewer than three base stations 220 located within an area of ten square kilometers, then the base stations 220 may be classified into a rural morphology.

In another example implementation, morphology classifier 410 may classify base stations 220 into morphologies based on an average quantity of base stations 220 located within two or more areas. For example, if there is a two by two grid of areas of a particular size, and the average quantity of base stations 220 located within each area is less than three, the base stations 220 may be classified into a rural morphology.

In another example implementation, morphology classifier 410 may classify base stations 220 into morphologies based on a height and/or antenna height of base station 220. For example, base stations 220 having a height and/or antenna height of less than 25 meters may be classified into an urban morphology, base stations 220 having a height and/or antenna height between 25 and 50 meters may be classified into a suburban morphology, and base stations 220 having a height and/or antenna height greater than 50 meters may be classified into a rural morphology.

In another example implementation, morphology classifier 410 may classify base stations 220 into morphologies based on a resource utilization of base station 220. For example, base stations 220 that allocate, on average, less than 10% of base station resources to eMBMS services may be classified into an urban morphology, base stations 220 that allocate, on average, 10% to 20% of base station resources to eMBMS services may be classified into a suburban morphology, and base stations 220 that allocate, on average, greater than 20% of base station resources to eMBMS services may be classified into a rural morphology.

In some implementations, morphology classifier 410 may use more than one type of base station configuration data to classify base stations 220 into morphologies. For example, base stations 220 with an inter-site distance greater than 3 kilometers and a base station height less than 40 meters may be classified as dense rural, while base stations 220 with an inter-site distance greater than 3 kilometers and a base station height greater than 40 meters may be classified as sparse rural. Additionally, or alternatively, morphology classifier 410 may apply different weights to different types of base station configuration data in order to classify base stations 220 into morphologies. For example, inter-site distance of base stations 220 may be weighted more heavily than base station height when determining a base station morphology classification.

In some implementations, morphology classifier 410 may group base stations 220 into a cluster based on base station configuration data, and may use base station configuration data averaged over the cluster along with other base station configuration data to classify the clustered base stations 220 into a morphology. For example, base stations 220 located in a particular geographic area and having an inter-site distance less than 100 meters may be grouped into a femtocell cluster. Morphology classifier 410 may use an average geographic location of the base stations 220 grouped in the femtocell cluster to calculate the inter-site distance between the femtocell cluster and a base station 220 that neighbors the femtocell cluster.

Morphology classifier 410 may update base station morphology classifications when morphology classifier 410 receives new and/or updated base station configuration data. For example, when a base station 220 is constructed, destroyed, moved, offline (e.g., due to a failure), etc., base station configuration data may be updated in real-time, near real-time, and/or on a periodic basis. Morphology classifier 410 may use the new and/or updated base station configuration data to reclassify base stations 220 into morphologies.

Morphology classifier 410 may store base station configuration data to aid in classifying base stations 220 into morphologies. Additionally, or alternatively, morphology classifier 410 may receive base station configuration data that is stored in another component. Morphology classifier 410 may store base station morphologies and/or morphology classifier 410 may communicate base station morphologies to be stored and/or utilized by another component.

Figure 5:
FIG. 5 is a diagram of an example data structure that stores information associated with base stations.

FIG. 5 is a diagram of an example data structure 500 that stores information associated with base stations 220, base station configuration data, and base station morphologies. Data structure 500 may be stored in a memory device (e.g., RAM, hard disk, etc.) associated with one or more components shown in FIGS. 2-4. For example, data structure 500 may be stored by base station 220, MME 235, resource scheduling assistant 280, memory 330, morphology classifier 410, etc.

Data structure 500 may include a collection of fields, such as a base station identifier ("ID") field 505, a latitude field 510, a longitude field 515, a height field 520, an inter-site distance field 525, and a morphology field 530. Data structure 500 includes fields 505-530 for explanatory purposes. In practice, data structure 500 may include additional fields, fewer fields, different fields, or differently arranged fields than are described with respect to data structure 500. For example, data structure 500 may include fields for any combination of base station configuration data, as described elsewhere herein.

Base station identifier field 505 may store information associated with base station 220. Information stored by base station identifier field 505 may include a base station identifier, a base station identity code (BSIC), a network color code (NCC), a base station color code (BCC), base station address data, a base station location, and/or any other information that may be used to uniquely identify a base station 220 or set of base stations 220. In some implementations, base station identifier field 505 may also store information that identifies a cluster of base stations 220. For example, base station identifier field 505 may store information that identifies a cluster of picocells.

Latitude field 510 may store information associated with a geographic location (e.g., a latitude coordinate) of base station 220 identified by the base station identifier in base station identifier field 505. Longitude field 515 may store information associated with a geographic location (e.g., a longitude coordinate) of base station 220 identified by the base station identifier in base station identifier field 505. In some implementations, latitude field 510 and/or longitude field 520 may store information associated with an average geographic location of a cluster of base stations 220 identified by the base station identifier in base station identifier field 505. Additionally, or alternatively, data structure 500 may contain a field storing other information indicative of a geographic location of base station 220, other than latitude and longitude data, such as a street address.

Height field 520 may store information associated with the size (e.g., a height, an antenna height, an area, a volume, etc.) of base station 220 identified by the base station identifier in base station identifier field 505. In some implementations, height field 520 may store information associated with an average height and/or size of a cluster of base stations 220.

Inter-site distance field 525 may store information associated with a configuration (e.g., an inter-site distance between adjacent or nearest-neighbor base stations 220) of base station 220 identified by the base station identifier in base station identifier field 505. Morphology field 530 may store information associated with a morphology classification (e.g., urban, suburban, rural, etc.) of base station 220 identified by the base station identifier in base station identifier field 505.

Information for a single base station 220 is conceptually represented as a row in data structure 500. For example, the first row in data structure 500 corresponds to a base station 220 that has a base station ID of "BS-1," a latitude of "38.85," a longitude of "77.04," a height of "10 meters," an inter-site distance of "0.5 kilometers," and a morphology of "urban."

When storing information for a particular base station 220 in virtual memory, one or more fields of data structure 500 for the particular base station 220 may be stored in virtual memory. Likewise, when storing information for a particular base station 220 in physical memory, one or more fields of data structure 500 for the particular base station 220 may be stored in physical memory.

Figure 6:
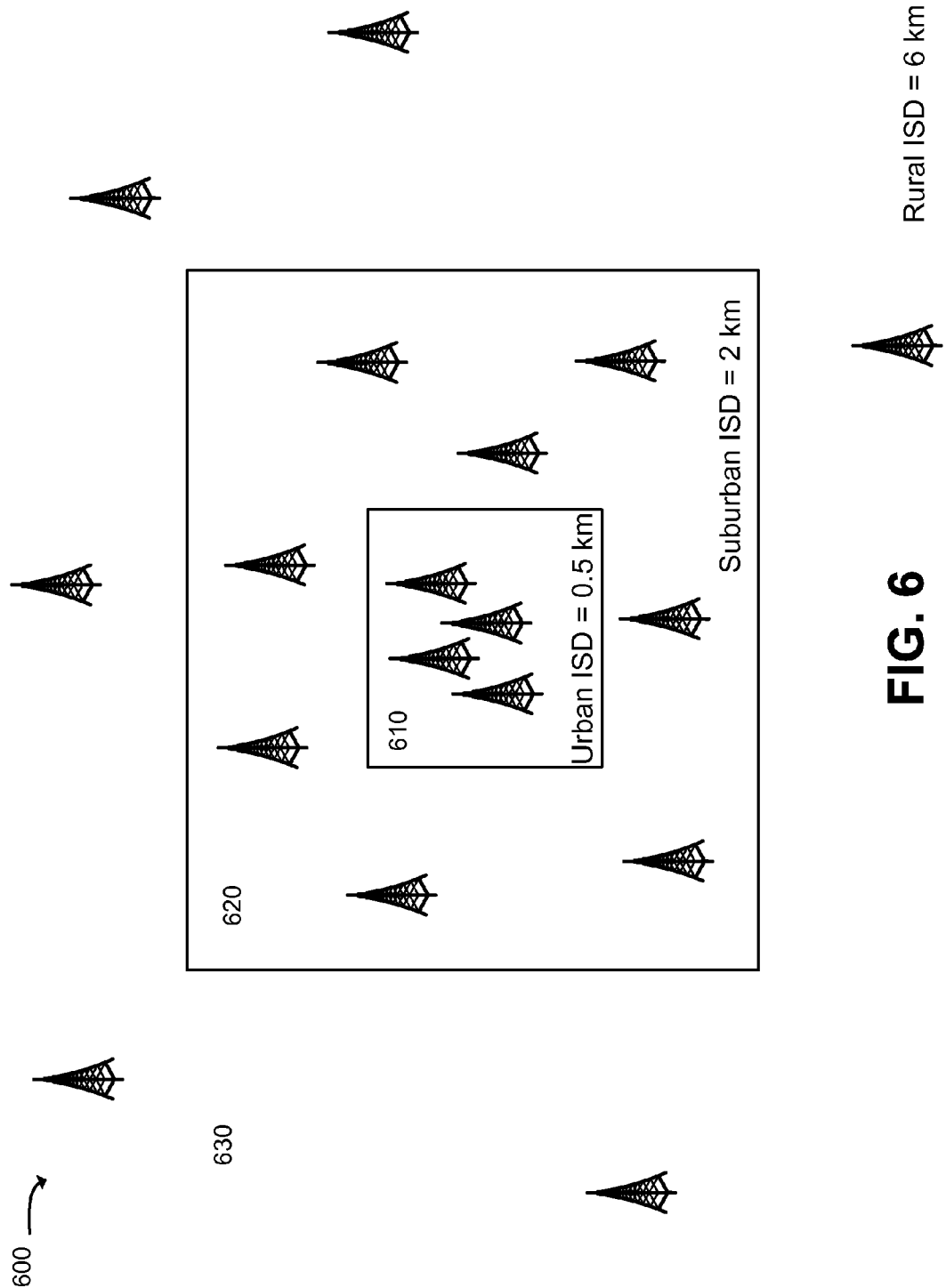
FIG. 6 is a diagram of an example classification of base stations into morphologies.

FIG. 6 is a diagram of an example classification of base stations 220 into morphologies. FIG. 6 shows a base station layout 600 with base stations 220 classified into three different morphologies: urban, suburban, and rural. In this example, morphology classifier 410 classifies base stations 220 having an inter-site distance ("ISD") of less than 1 kilometer into an urban morphology, base stations 220 having an ISD between 1 and 3 kilometers into a suburban morphology, and base stations 220 having an ISD greater than 3 kilometers into a rural morphology.

As shown in FIG. 6, morphology classifier 410 has classified base stations 220 within boundary 610 as urban because the ISD (distance between adjacent base stations 220) of base stations 220 within boundary 610 is equal to 0.5 kilometers, which is less than the 1 kilometer threshold. Likewise, morphology classifier 410 has classified base stations 220 within boundary 620 (but outside of boundary 610) as suburban because the ISD of base stations 220 in boundary 620 is equal to 2 kilometers, which is between the 1 kilometer and 3 kilometer thresholds. Finally, morphology classifier 410 has classified base stations 220 within outer boundary 630 (but not within boundaries 610 or 620) as rural because the ISD of base stations 220 in boundary 630 is equal to 6 kilometers, which is greater than the 3 kilometer threshold.

Returning to FIG. 4, resource utilization analyzer 420 may receive resource utilization data that aids in analyzing network resource utilization of base stations 220. Resource utilization data may include data associated with resource usage of one or more base stations 220. Base station resources may include RAN resources, LTE resources, radio resources, bandwidth, capacity, coverage, data rates, number of radio frames/subframes, etc. For example, the resource utilization data may be an amount, a portion, and/or a fraction of individual base station resources being utilized to provide different types of network services, such as unicast services and/or eMBMS services.

Resource utilization data may be gathered for one or more service types, such as guaranteed bit rate services other than eMBMS ("GBR services"), non-guaranteed bit rate services ("non-GBR services"), and evolved multimedia broadcast multicast services ("eMBMS services"). Examples of GBR services include voice over IP ("VoIP"), conversational video, and conversational voice. In 3GPP terminology, GBR services include services with quality of service class indicator values of 1-3. Examples of non-GBR services include unicast services, such as Internet traffic and email. In 3GPP terminology, non-GBR services include services with quality of service class indicator values of 5-9. Examples of eMBMS services include multicast and broadcast services (e.g., non-conversational video). In 3GPP terminology, eMBMS services include services with a quality of service class indicator value of 4.

Resource utilization analyzer 420 may receive base station resource utilization data for GBR services, non-GBR services, and/or eMBMS services. Resource utilization analyzer 420 may gather resource utilization data from a single base station 220, a set of one or more base stations 220, or every base station 220 in a network. Resource utilization analyzer 420 may receive resource utilization data from one or more base stations 220 periodically. For example, resource utilization analyzer 420 may receive resource utilization data from a base station 220 according to a sampling interval (e.g., every 30 minutes), which may be different for different base stations 220 and/or morphologies. The received resource utilization data may include an average resource utilization of a base station 220 during the time period since the last sample was taken.

Resource utilization analyzer 420 may calculate a derived resource utilization value from the resource utilization data. For example, resource utilization analyzer 420 may calculate an average resource utilization for a base station 220 and/or morphology over an interval based on a quantity of resource utilization data samples collected during the interval. Resource utilization analyzer 420 may update resource utilization data and derived resource utilization values as additional resource utilization data is received from base stations 220.

Resource utilization analyzer 420 may store resource utilization data. Additionally, or alternatively, resource utilization analyzer 420 may receive resource utilization data that is stored in another component. Additionally, or alternatively, resource utilization analyzer 420 may store derived resource utilization values and/or resource utilization analyzer 420 may communicate derived resource utilization values to be stored and/or utilized by another component.

FIG. 7 is a diagram of an example data structure 700 that stores information associated with base station resource utilization. Data structure 700 may be stored in a memory device (e.g., RAM, hard disk, etc.) associated with one or more components shown in FIGS. 2-4. For example, data structure 400 may be stored by base station 220, MME 235, resource scheduling assistant 280, memory 330, resource utilization analyzer 420, etc.

Data structure 700 may include a collection of fields, such as a base station identifier ("ID") field 705, a morphology field 710, a sampling interval field 715, one or more resource utilization fields 720-1 through 720-X (X≥1), and an average resource utilization field 725. Data structure 700 includes fields 705-725 for explanatory purposes. In practice, data structure 700 may include additional fields, fewer fields, different fields, or differently arranged fields than are described with respect to data structure 700. For example, data structure 700 may include fields for any combination of resource utilization data, as described elsewhere herein.

Base station identifier field 705 may store information associated with a base station 220. Information stored by base station identifier field 705 may include a base station identifier, a base station identity code (BSIC), a network color code (NCC), a base station color code (BCC), base station address data, a base station location, and/or any other information that may be used to uniquely identify a base station 220 or a set of base stations 220. In some implementations, base station identifier field 505 may also store information that identifies a cluster of base stations 220. For example, base station identifier field 505 may store information that identifies a cluster of picocells.

Morphology field 710 may store information associated with a morphology classification (e.g., urban, suburban, rural, picocell, etc.) of base station 220 identified by the base station identifier in base station identifier field 705. Sampling interval field 715 may store information associated with a sampling interval for base station 220 identified by the base station identifier in base station identifier field 705. A sampling interval may indicate how often resource utilization data is communicated from base station 220 to resource utilization analyzer 420.

Resource utilization fields 720-1 through 720-X may store information associated with resource utilization data samples of base station 220 identified by the base station identifier in base station identifier field 705. For example, resource utilization fields 720 may store information indicating an amount, portion, and/or fraction of base station resources allocated to different service types (e.g., GBR services, non-GBR services, eMBMS services, etc.). The information stored in resource utilization fields 720 may be historical resource utilization data and/or current resource utilization data. Resource utilization fields 720 may be added and/or updated periodically (e.g., according to a sampling interval for base station 220). Resource utilization fields 720 may be populated with data indicative of a current resource utilization of base station 220 at a particular time. Additionally, or alternatively, resource utilization fields 720 may be populated with data indicative of an average resource utilization of base station 220 during a time period that has elapsed since a previous sample was taken. In some implementations, resource utilization fields 720 may be populated with data indicative of an average resource utilization of a cluster of base stations 220 identified by the base station identifier in base station identifier field 705.

Different base stations 220 may have a different quantity of resource utilization fields 720. The quantity of resource utilization fields 720 may depend on a base station identifier, a morphology, and/or a sampling interval. Resource utilization fields 720 may be removed as additional resource utilization data is gathered. For example, data structure 700 may not allow more than a particular quantity of resource utilization data samples to be stored for a particular base station 220. As additional resource utilization data samples are gathered and stored in data structure 700, older resource utilization data samples (e.g., the oldest or first data sample) may be removed from data structure 700.

Average resource utilization field 725 may store information associated with an average resource utilization of base station 220 identified by the base station identifier in base station identifier field 705. Average resource utilization field 725 may be added and/or updated periodically (e.g., according to a sampling interval for base station 220). The average resource utilization may be based on a particular quantity of resource utilization data samples. For example, the average resource utilization may be calculated based on the 15 most recent resource utilization data samples.

Resource utilization data samples may be grouped so that the data samples may be incorporated into an average resource utilization calculation. For example, resource utilization data samples may be grouped according to a base station 220 from which the data samples are collected, a morphology of a base station 220 from which the data samples are collected, a date on which the data samples are collected, a time at which the data samples are collected, a season during which the data samples are collected, and/or any transmission event that is occurring at the time the data samples are collected (e.g., whether a data sample was collected during a particular broadcast and/or multicast event, such as the Super Bowl). The average resource utilization may be calculated based on these grouped data samples. For example, the average resource utilization may be calculated based on the last 20 data samples collected during "prime time" hours (e.g., between 7 pm and 10 pm on a weekday), or the last 30 data samples collected during the Super Bowl. As another example, the average resource utilization may be calculated for a particular morphology.

Data structure 700 may store multiple average resource utilization values. For example, average resource utilization values may be calculated for any number of data samples collected throughout a particular time period. For example, average resource utilization values may be calculated for each hour of a day, each day of a week, each week of a year, etc.

Information for a single base station 220 is conceptually represented as a row in data structure 700. For example, the first row in data structure 700 corresponds to a base station 220 that has a base station ID of "BS-1," a morphology of "urban," a sampling interval of "5 minutes," a resource utilization at time T=1 of "40% GBR, 55% non-GBR, 5% eMBMS," a resource utilization at time T=X of "40% GBR, 45% non-GBR, 15% eMBMS," and an average resource utilization of "40% GBR, 50% non-GBR, 10% eMBMS."

When storing information for a particular base station 220 in virtual memory, one or more fields of data structure 700 for the particular base station 220 may be stored in virtual memory. Likewise, when storing information for a particular base station 220 in physical memory, one or more fields of data structure 700 for the particular base station 220 may be stored in physical memory.

Returning to FIG. 4, resource allocation recommender 430 may generate resource allocation recommendations for one or more base stations 220 and/or one or more base station morphologies. The resource allocation recommendations may be based on historical resource utilization, current resource utilization, and/or forecasted resource utilization.

Historical resource utilization may be determined from stored resource utilization data, such as data stored in data structure 700. Current resource utilization may be a real-time resource utilization collected on-demand and/or a near-real time resource utilization based on the most recently collected resource utilization data, such as the data stored in field 720-X and/or field 725 of data structure 700. A forecasted or predicted resource utilization may be calculated based on historical resource utilization data and/or current resource utilization data for a future point in time and/or a future time interval. For example, resource allocation recommender 430 may forecast a resource utilization for 5:00 to 6:00 pm tomorrow based on historical resource utilizations at 5:00 to 6:00 pm for the past several days.

To generate a resource allocation recommendation, resource allocation recommender 430 may determine an amount, a portion, and/or a fraction of network resources available for allocation to one or more services (e.g., GBR services, eMBMS services, etc.) during a particular time period (e.g., a set number of hours, a duration of a particular broadcast/multicast, etc.) for one or more base stations 220 and/or one or more morphologies. Network resources may be divided between GBR services, non-GBR services, and eMBMS services. In some implementations, the fraction of resources allocated to GBR services, non-GBR services, and eMBMS services sums to 1 (likewise, the percentage of resources allocated to GBR services, non-GBR services, and eMBMS services sums to 100%). By determining resource utilization of GBR and non-GBR services for each morphology, resource allocation recommender 430 may determine network resource availability for eMBMS services for each morphology. For example, if resource allocation recommender 430 receives data from base station 220 indicating that 40% of base station resources are allocated to GBR services and 50% of base station resources are allocated to non-GBR services, resource allocation recommender 430 may determine that 10% of base station resources are available for allocation to eMBMS services.

In some implementations, the amount, portion, and/or fraction of base station resources allocated to GBR services is fixed. For example, the fraction of base station resources allocated to GBR services may be fixed at 40%. The remaining 60% of base station resources may be allocated between non-GBR services and eMBMS services. Thus, resource allocation recommender 430 may recommend a resource allocation for eMBMS services based solely on non-GBR resource utilization data. For example, resource utilization analyzer 420 may determine that 40% of base station resources are being utilized for non-GBR resources. In this situation, resource allocation recommender 430 may recommend that 20% of base station resources be allocated to eMBMS services.

Resource allocation recommender 430 may generate one or more resource allocation recommendations for one or more time periods. For example, resource allocation recommender 430 may generate a resource allocation recommendation for one or more upcoming time periods (e.g., the next two hours, the next four hours in one hour increments, etc.), a predetermined time period (e.g., between 4 pm and 6 pm on a particular date), a recurring time period (e.g., between 5 pm and 8 pm every Tuesday), during a particular broadcast and/or multicast (e.g., for the duration of a particular football game broadcast), and/or for any other definable time period.

Resource allocation recommender 430 may generate one or more resource allocation recommendations for one or more base stations 220 and/or one or more morphologies. For example, resource allocation recommender 430 may generate a resource allocation recommendation for a single base station 220 (e.g., BS-1 of FIGS. 5 and 7) and/or a set of one or more base stations 220. Additionally, or alternatively, resource allocation recommender 430 may generate a resource allocation recommendation for one or more base stations 220 having a particular classification, such as those classified within a particular morphology (e.g., all base stations 220 classified into an "urban" morphology). Resource allocation recommender 430 may use any combination of base station configuration and/or morphology data to determine a set of base stations 220 to be included in a resource allocation recommendation.

Resource allocation recommender 430 may receive content transmission data. Content transmission data may include information associated with an upcoming and/or current content transmission, such as the service type of the transmission (e.g., GBR, non-GBR, eMBMS, unicast, broadcast, multicast, etc.), time data associated with the transmission (e.g., date of the transmission, start time of the transmission, end time of the transmission, etc.), size data associated with the transmission (e.g., stream rate, data transmission rate, bit rate, etc.), a location to which the transmission is being transmitted (e.g., a geographic area), one or more base stations 220 to which the transmission is to be transmitted (e.g., delivery only to base stations 220 in a particular geographic area, such as the west coast, a particular city, a particular state, etc.), and/or one or more morphologies to which the transmission is to be transmitted (e.g., delivery only to base stations 220 having an "urban" morphology). A content transmission may refer to any transmitted content, such as content transmitted by content provider 260 (e.g., over network 290).

Resource allocation recommender 430 may generate resource allocation recommendations based on the content transmission data. For example, resource allocation recommender 430 may generate resource allocation recommendations for only base stations 220 and/or morphologies identified in the content transmission data. As another example, resource allocation recommender 430 may recommend that a percentage of resources be allocated services based on data transmission rates. For example, resource allocation recommender 430 may recommend that more resources (e.g., a higher percentage) be allocated to an 800 kilobit per second data stream than a 300 kilobit per second data stream. Resource allocation recommender 430 may use any combination of content transmission data to generate resource allocation recommendations.

Resource allocation recommender 430 may receive service level target data. Service level target data may include any data associated with service quality, such as a target coverage area (e.g., a percentage of a geographical area, a percentage of a sector or cell area, a percentage of subscribers that meet or exceed a minimum target performance criterion, etc.), a target bit rate, a target data rate and/or stream, a target packet error rate, a target block error rate, a target signal to interference plus noise ratio (SINR), a target received signal strength indicator (RSSI) value, a target amount of forward error correction (FEC) overhead, or the like. Resource allocation recommender 430 may use any combination of service level target data when making resource allocation recommendations. For example, resource allocation recommender 430 may check to ensure that resource allocation recommendations meet service level targets.

The resource allocation recommendations generated by resource allocation recommender 430 may include a predicted maximum allowable resource allocation for different services (such as eMBMS services) during a particular time period. The maximum allowable resource allocation may be based on service level targets for one or more services. For example, resource allocation recommender 430 may determine that in order to maintain service level targets for GBR services and non-GBR services, a maximum of 10% of resources may be allocated to eMBMS services during a particular time period. Additionally, or alternatively, the maximum allowable resource allocation may be based on current and/or historical resource utilization data.

The resource allocation recommendations generated by resource allocation recommender 430 may identify an amount, a portion, and/or fraction of resources required to support transmission of content of various sizes (e.g., a broadcast and/or multicast of 500 Kbps, 1 Mbps, etc.). For example, resource allocation recommender 430 may determine that in order to support a 1 Mbps broadcast for the next two hours, base stations 220 in an urban morphology should allocate 10% of resources to eMBMS, while base stations 220 in a rural morphology should allocate 20% of resources to eMBMS.

The resource allocation recommendations generated by resource allocation recommender 430 may identify a number of supported content streams with various streaming rates. For example, resource allocation recommender 430 may determine that a particular base station 220 or base station morphology can support one content stream of 1 Mbps for the next hour, two content streams of 500 Kbps for the next hour, four content streams of 250 Kbps for the next hour, etc. The number of supported content streams having a particular streaming rate may be based on a percentage of resources (e.g., eMBMS resources) that can be allocated to the content streams. Additionally, or alternatively, the resource allocation recommendation generated by resource allocation recommender 430 may be a recommended Modulation and Coding Scheme (MCS) index value that supports a particular data transmission rate.

Resource allocation recommender 430 may transmit resource allocation recommendations to one or more components and/or devices. In some implementations, resource allocation recommender 430 may transmit resource allocation recommendations to content provisioning system 270 and/or base station 220.

Figure 8:
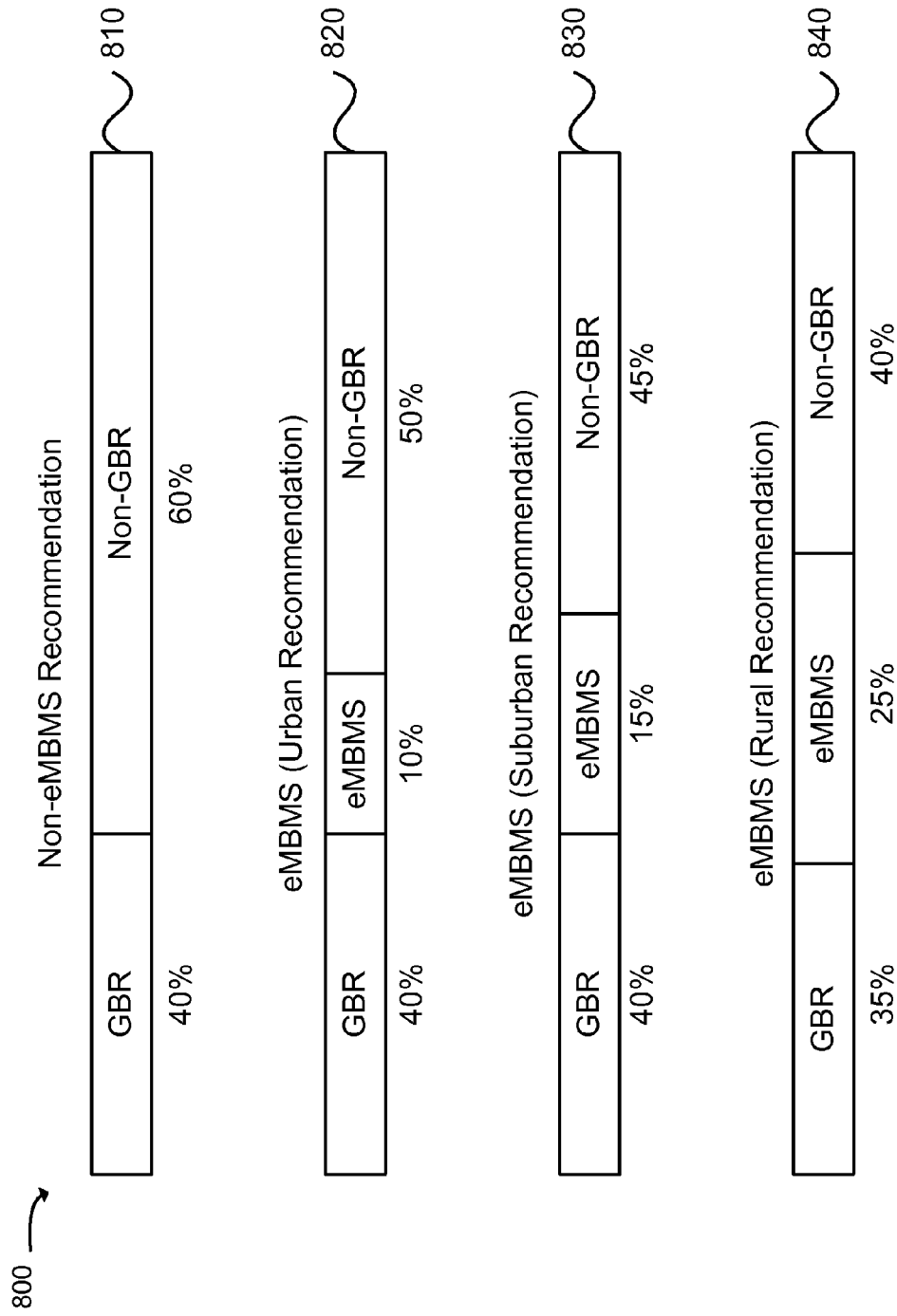
FIG. 8 is a diagram of example resource allocation recommendations for various base station morphologies.

FIG. 8 is a diagram of example resource allocation recommendations 800 for various base station morphologies. Item 810 illustrates a resource allocation recommendation where eMBMS services are not used. The illustrated recommendation 810 is that 40% of resources should be allocated to GBR services and 60% of resources should be allocated to non-GBR services. Item 820 illustrates a resource allocation recommendation for base stations 220 classified in an urban morphology. The illustrated urban morphology recommendation 820 is that 40% of resources should be allocated to GBR services, 50% of resources should be allocated to non-GBR services, and 10% of resources should be allocated to eMBMS services. Item 830 illustrates a resource allocation recommendation for base stations 220 classified in a suburban morphology. The illustrated suburban morphology recommendation 830 is that 40% of resources should be allocated to GBR services, 45% of resources should be allocated to non-GBR services, and 15% of resources should be allocated to eMBMS services. Item 840 illustrates a resource allocation recommendation for base stations 220 classified in a rural morphology. The illustrated rural morphology recommendation 840 is that 35% of resources should be allocated to GBR services, 40% of resources should be allocated to non-GBR services, and 25% of resources should be allocated to eMBMS services. In these implementations, the percentages of resources allocated to GBR services, non-GBR services, and eMBMS services sum to 100%.

Figure 9:
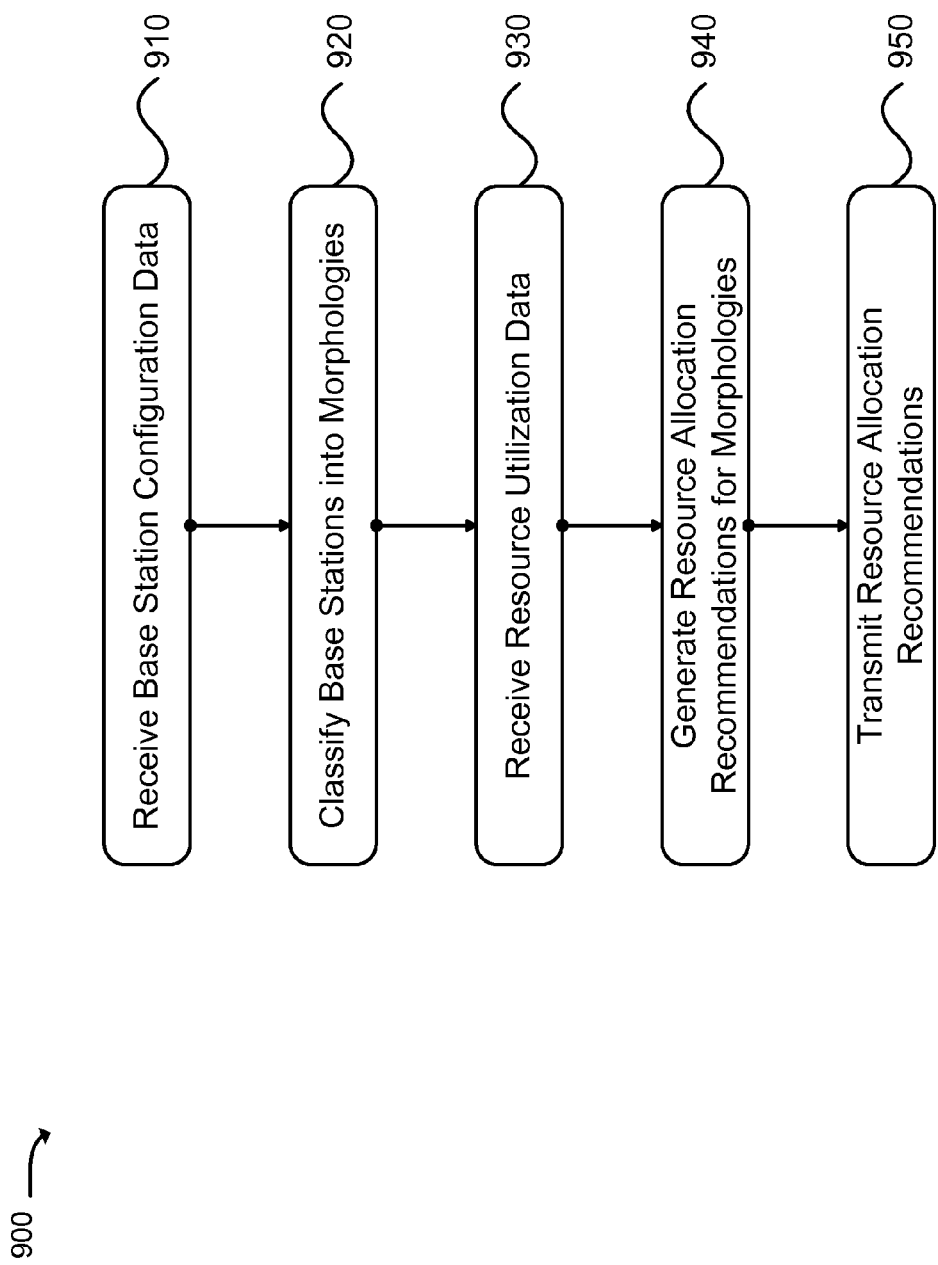
FIG. 9 is a diagram of an example process for generating resource allocation recommendations for base station morphologies.

FIG. 9 is a diagram of an example process 900 for creating resource allocation recommendations for base station morphologies. In some implementations, one or more of the process blocks of FIG. 9 may be performed by one or more components of resource scheduling assistant 280 and/or another device, such as SGW 230, PGW 240, content provisioning system 270, device 300, etc.

Process 900 may include receiving base station configuration data (block 910). In some implementations, morphology classifier 410 may receive base station configuration data, as described elsewhere herein. Base station configuration data may include any data that aids morphology classifier 410 in classifying base stations 220 into morphologies (e.g., location data, inter-site distance data, height data, etc.).

Process 900 may include classifying base stations 220 into morphologies (block 920). In some implementations, morphology classifier 410 may classify base stations 220 into morphologies based on base station configuration data, as described elsewhere herein. Example morphologies include an urban morphology, a suburban morphology, and/or a rural morphology. Base stations 220 may be classified into any number of morphologies based on their associated configuration data.

Process 900 may include receiving resource utilization data (block 930). In some implementations, resource utilization analyzer 420 may receive resource utilization data, as described elsewhere herein. Resource utilization data may include data indicative of a portion and/or fraction of network resources being utilized for various services, such as GBR services, non-GBR services, and/or eMBMS services.

Process 900 may include generating resource allocation recommendations for one or more morphologies (block 940). In some implementations, resource allocation recommender 430 may generate a resource allocation recommendation for a base station 220 based on the morphology in which the base station 220 is classified, as described elsewhere herein. Resource allocation recommendations may include a recommended allocation of resources to GBR services, non-GBR services, and/or eMBMS services.

Process 900 may include transmitting resource allocation recommendations (block 950). In some implementations, resource allocation recommender 430 may transmit a resource allocation recommendation to another component and/or device, such as base station 220 and/or content provisioning system 270, as described elsewhere herein.

Figure 10:
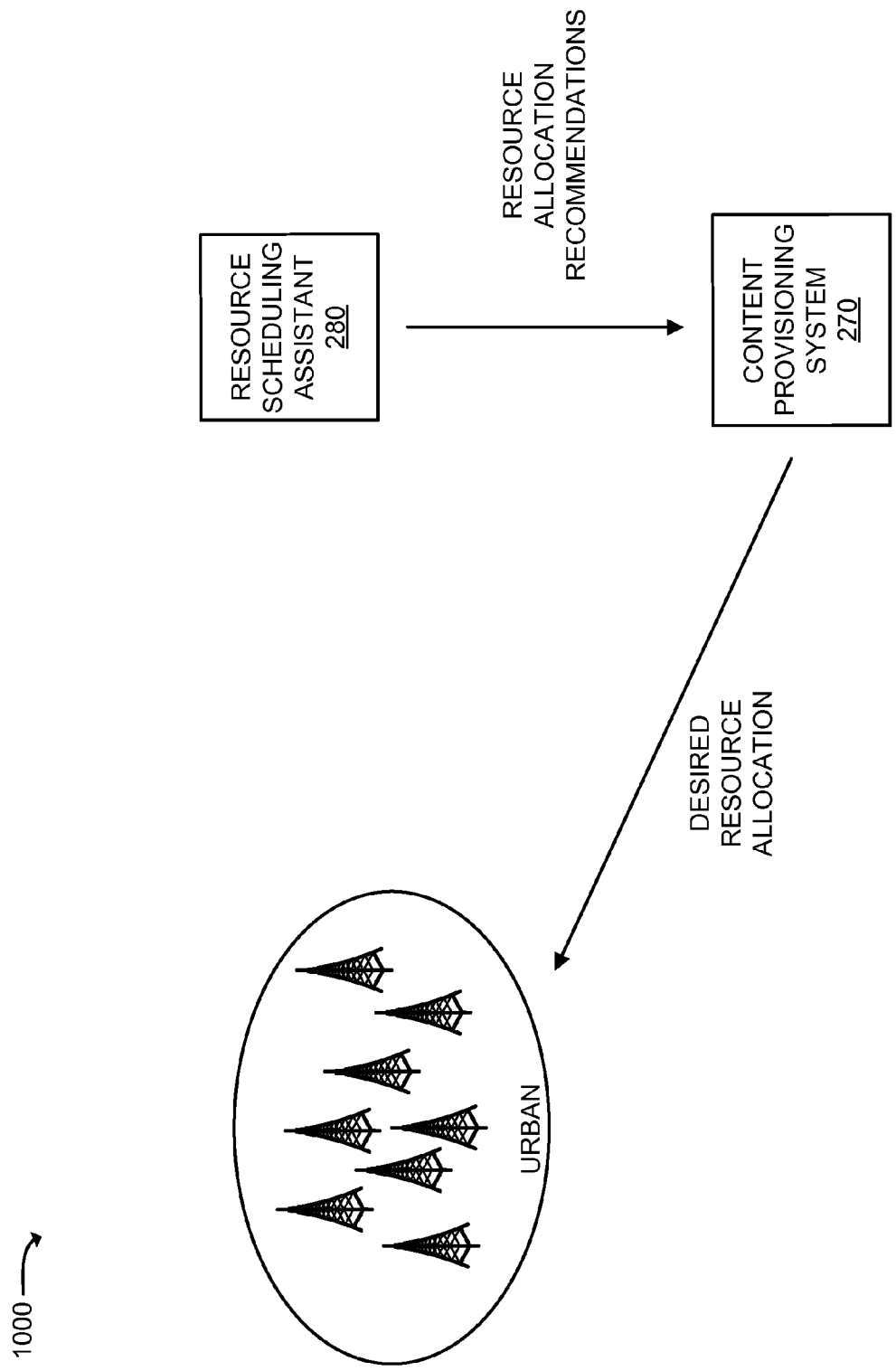
FIG. 10 is a diagram of an example implementation for using resource allocation recommendations to configure base stations.

FIG. 10 is a diagram of an example implementation 1000 for using resource allocation recommendations to configure base stations 220. As shown in FIG. 10, resource scheduling assistant 280 may transmit resource allocation recommendations to content provisioning system 270. Content provisioning system 270 may determine a desired resource allocation based on the resource allocation recommendations transmitted by resource scheduling assistant 280. Content provisioning system 270 may transmit the desired resource allocation to one or more base stations 220 (e.g., base stations 220 classified into a particular morphology) in order to instruct base stations 220 to allocate base station resources according to the desired resource allocation.

Figure 11:
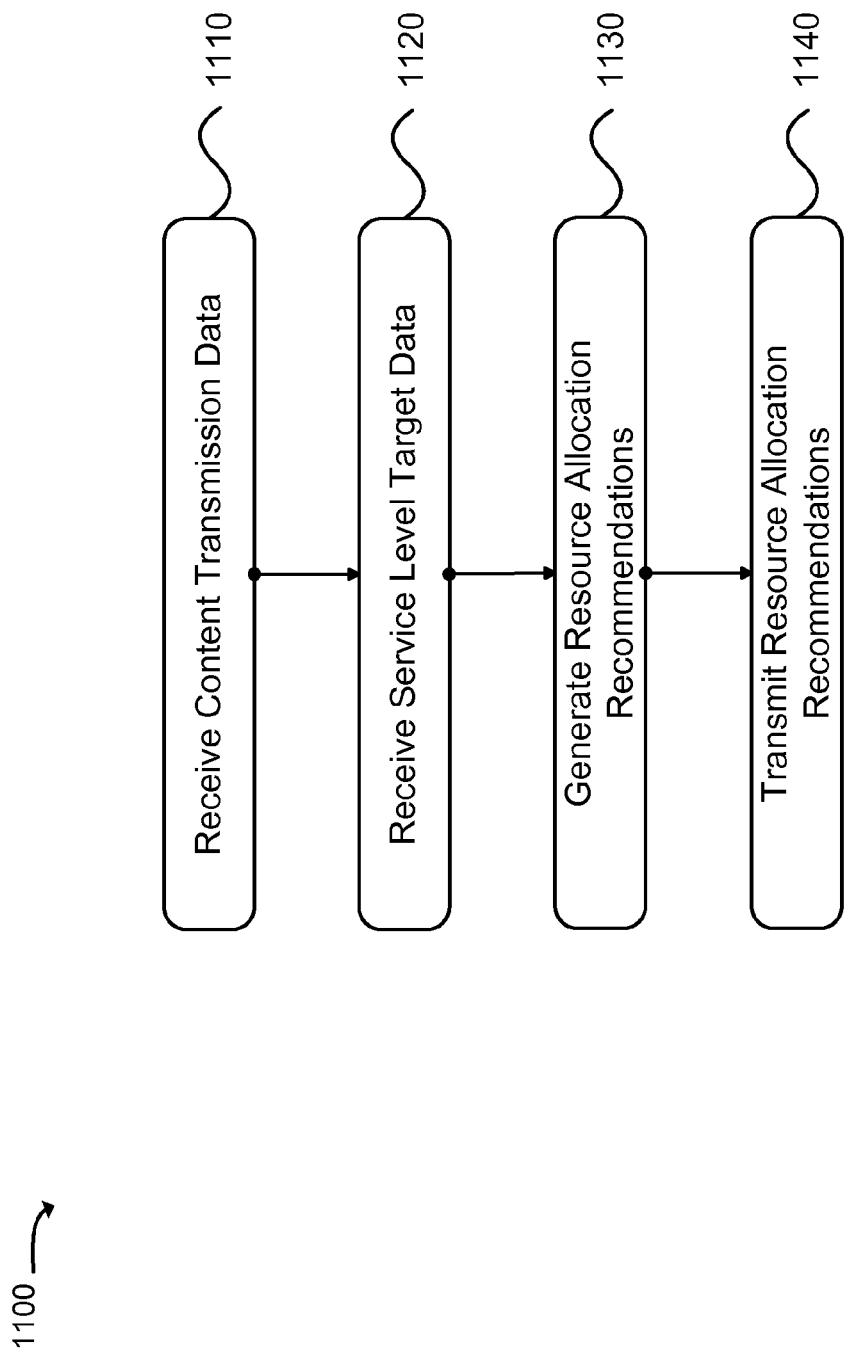
FIG. 11 is a diagram of an example process for generating resource allocation recommendations for content transmission events.

FIG. 11 is a diagram of an example process 1100 for generating resource allocation recommendations for content transmission events. In some implementations, one or more of the process blocks of FIG. 11 may be performed by one or more components of resource scheduling assistant 280 and/or another device, such as SGW 230, PGW 240, content provisioning system 270, device 300, etc.

Process 1100 may include receiving content transmission data (block 1110). In some implementations, resource allocation recommender 430 may receive content transmission data, as described elsewhere herein. Content transmission data may include any data associated with a content transmission that aids resource allocation recommender 430 in generating resource allocation recommendations (e.g., data transmission rate of the content transmission, service type of the content transmission, destination of the content transmission, etc.).

Process 1100 may include receiving service level target data (block 1120). In some implementations, resource allocation recommender 430 may receive service level target data, as described elsewhere herein. Service level target data may include any data associated with a target service quality that aids resource allocation recommender 430 in generating resource allocation recommendations (e.g., a target bit rate, a target packet error rate, a target coverage area, etc.).

Process 1100 may include generating resource allocation recommendations (block 1130). In some implementations, resource allocation recommender 430 may generate a resource allocation recommendation for one or more base stations 220 and/or base station morphologies, as described elsewhere herein. The generated resource allocation recommendation may be based on the content transmission data and/or the service level target data.

Process 1100 may include transmitting resource allocation recommendations (block 1140). In some implementations, resource allocation recommender 430 may transmit a resource allocation recommendation to another component and/or device, such as base station 220 and/or content provisioning system 270, as described elsewhere herein.

Figure 12:
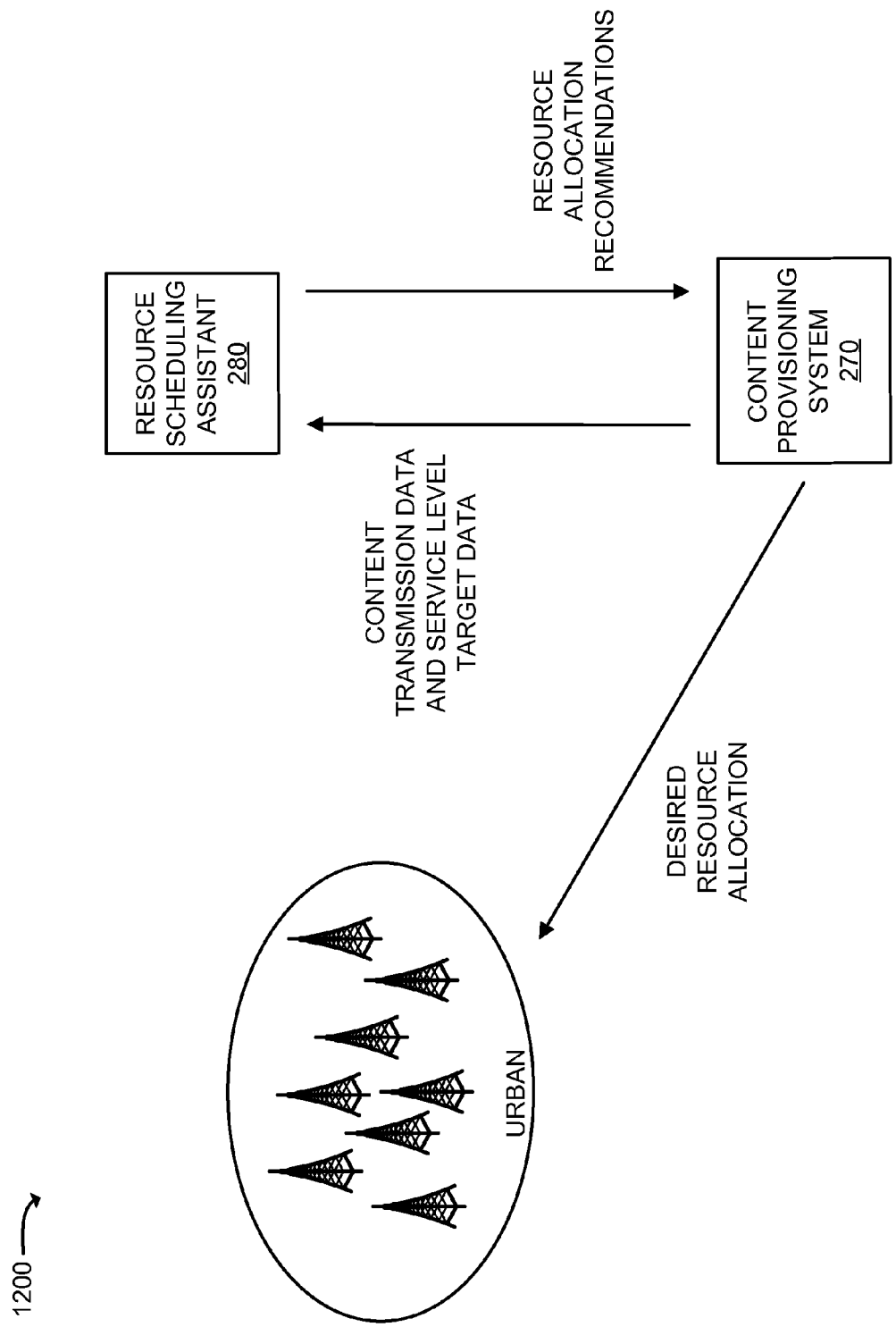
FIG. 12 is a diagram of an example implementation for using resource allocation recommendations to configure base stations.

FIG. 12 is a diagram of an example implementation 1200 for using resource allocation recommendations to configure base stations 220. As shown in FIG. 12, resource scheduling assistant 280 may receive content transmission data and service level target data from content provisioning system 270. Resource scheduling assistant 280 may generate resource allocation recommendations based on the content transmission data and service level target data, and may transmit the resource allocation recommendations to content provisioning system 270. Content provisioning system 270 may determine a desired resource allocation based on the resource allocation recommendations, the content transmission data, and/or the service level target data. Content provisioning system 270 may transmit the desired resource allocation to one or more base stations 220 (e.g., base stations 220 classified into a particular morphology) in order to instruct base stations 220 to allocate base station resources according to the desired resource allocation The foregoing disclosure provides illustration and description, but is not intended to be exhaustive or to limit the embodiments to the precise form disclosed. Modifications and variations are possible in light of the above disclosure or may be acquired from practice of the embodiments.

While series of blocks have been described with regard to FIGS. 9 and 11, the order of the blocks may be modified in some implementations. Further, non-dependent blocks may be performed in parallel.

Certain data structures have been presented with regard to FIGS. 5 and 7. These data structures are purely examples and merely serve to facilitate the description of the storage of information associated with base stations 220 and resource utilization.

As used herein, the term "component" is intended to be broadly construed as hardware, firmware, software, or any combination thereof.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the possible implementations. In fact, many of these features may be combined in ways not specifically recited in the claims and/or disclosed in the specification. No element, act, or instruction used herein should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a processor, base station configuration data associated with a plurality of base stations;
   classifying, by the processor, one or more base stations, of the plurality of base stations, into one or more morphologies based on the base station configuration data;
   identifying, by the processor, resource utilization data associated with the one or more base stations classified into the one or more morphologies,
      the resource utilization data comprising at least one of:
         a portion of base station resources allocated to unicast services;
         a portion of the base station resources allocated to multicast and broadcast services; or
         a portion of the base station resources allocated to services that are different from the unicast services and the multicast and broadcast services;
   generating, by the processor, one or more resource allocation recommendations for the one or more base stations classified into the one or more morphologies based on the resource utilization data and the one or more morphologies; and
   transmitting, by the processor, one or more of the resource allocation recommendations for the one or more base stations classified into the one or more morphologies to permit the one or more base stations to allocate resources based on at least one of the one or more resource allocation recommendations.

2. The method of claim 1, where the base station configuration data comprises at least one of:
   a geographic location of a particular base station of the one or more base stations;
   an inter-site distance between the particular base station and a neighboring base station of the plurality of base stations; or
   an antenna height of the particular base station.

3. The method of claim 1, where classifying the one or more base stations comprises classifying the one or more base stations into one or more morphologies based on comparing an inter-site distance between neighboring base stations to a threshold value.

4. The method of claim 1, where identifying the resource utilization data includes:

collecting a plurality of resource utilization data samples; and generating the resource utilization data based on the plurality of resource utilization data samples.

5. The method of claim 1, where the one or more resource allocation recommendations for the one or more base stations classified into the one or more morphologies comprise at least one of:

a recommended portion of the base station resources to allocate to the unicast services;

a recommended portion of the base station resources to allocate to the multicast and broadcast services; or a maximum allowable portion of the base station resources that can be allocated to the multicast and broadcast services.

6. The method of claim 1, where the one or more resource allocation recommendations for the one or more base stations classified into the one or more morphologies comprise a predicted maximum allowable portion of the base station resources that can be allocated to the multicast and broadcast services during one or more time periods.

7. The method of claim 1, where generating the one or more resource allocation recommendations comprises:

receiving, by a processor, content transmission data,
the content transmission data identifying at least one of:
a time period associated with a content transmission;
a bit rate associated with the content transmission; or
a particular base station, of the one or more base stations, that is associated with the content transmission; and using the content transmission data to generate the one or more resource allocation recommendations for the one or more base stations classified into the one or more morphologies.

8. The method of claim 1, where generating the one or more resource allocation recommendations comprises:

receiving, by a processor, a target bit rate; and using the target bit rate to generate the one or more resource allocation recommendations for the one or more base stations classified into the one or more morphologies.

9. A non-transitory computer-readable medium, comprising:

one or more instructions that, when executed by one or more processors of a device, cause the one or more processors to:

receive a classification of a plurality of base stations into one or more morphologies;

receive resource utilization data associated with one or more base stations of the plurality of base stations;

receive content transmission data associated with one or more content transmissions,
the content transmission data identifying:
a time period associated with a content transmission of the one or more content transmissions, and
a bit rate associated with the content transmission;

generate one or more resource allocation recommendations for the one or more base stations based on the resource utilization data, the content transmission data, and the one or more morphologies; and transmit at least one of the one or more resource allocation recommendations to permit the one or more base stations to allocate resources based on the at least one of the one or more resource allocation recommendations.

10. The non-transitory computer-readable medium of claim 9, where the one or more instructions to generate the one or more resource allocation recommendations comprise:

one or more instructions to generate a resource allocation recommendation, of the one or more resource allocation recommendations, associated with the content transmission during the time period associated with the content transmission and based on the bit rate associated with content transmission.

11. The non-transitory computer-readable medium of claim 9, where the one or more instructions to generate the one or more resource allocation recommendations comprise:

one or more instructions to determine a quantity of content transmissions that can be supported by the one or more morphologies at the bit rate associated with the content transmission during the time period associated with the content transmission, and one or more instructions to generate the one or more resource allocation recommendations based on the quantity of content transmissions.

12. The non-transitory computer-readable medium of claim 9, where the resource utilization data comprises at least one of:

a portion of base station resources allocated to unicast services, a portion of the base station resources allocated to multicast and broadcast services, or a portion of the base station resources allocated to services that are different from the unicast services and the multicast and broadcast services.

13. The non-transitory computer-readable medium of claim 9, where receiving the resource utilization data comprises:

collecting a plurality of resource utilization data samples; and generating the resource utilization data based on the plurality of resource utilization data samples.

14. A system, comprising:

a memory; and a processor to:

receive a classification of a plurality of base stations into one or more morphologies;

receive resource utilization data for one or more base stations, of the plurality of base stations, classified into a particular morphology of the one or more morphologies,
the resource utilization data comprising a portion of base station resources allocated to one or more service types;

calculate an average resource utilization for the one or more base stations classified into the particular morphology over a first time period,
the average resource utilization comprising an average portion of the base station resources allocated to the one or more service types;

forecast a predicted resource utilization for the one or more base stations classified into the particular morphology over a second time period,
the second time period being associated with the first time period, and
the predicted resource utilization comprising a portion of the base station resources predicted to be allocated to the one or more service types during the second time period; and transmit the predicted resource utilization to permit the one or more base stations classified into the particular morphology to allocate resources based on the predicted resource utilization.

15. The system of claim 14, where the one or more service types comprise:
    guaranteed bit rate services other than evolved multimedia broadcast multicast services;
    non-guaranteed bit rate services; and
    evolved multimedia broadcast multicast services.

16. The system of claim 14, where the first time period comprising a plurality of related time periods.

17. The system of claim 14, where the processor is further to:
    generate a resource allocation recommendation based on the predicted resource utilization,
        the resource allocation recommendation comprising a recommended portion of the base station resources to be allocated to each of the one or more service types.

18. The system of claim 17, where the one or more service types comprise evolved multimedia broadcast multicast services.

19. The system of claim 14, where the processor is further to:
    receive content transmission data,
        the content transmission data comprising:
            a service type, of the one or more service types, associated with a content transmission, and
            time data associated with the content transmission; and
    generate a resource allocation recommendation based on the predicted resource utilization and the content transmission data,
        the predicted resource utilization being associated with a time period identified by the time data associated with the content transmission, and
        the resource allocation recommendation comprising a recommended portion of the base station resources to be allocated to the service type associated with the content transmission.

20. The system of claim 14, where the processor is further to:
    receive service level target data,
        the service level target data comprising a service level target associated with a content transmission; and
    generate a resource allocation recommendation based on the predicted resource utilization and the service level target data,
        the resource allocation recommendation comprising a recommended portion of base station resources to be allocated to a service type, of the one or more service types, in order to satisfy the service level target associated with the content transmission.

* * * * *